US010787725B2

(12) United States Patent
Fujieda et al.

(10) Patent No.: US 10,787,725 B2
(45) Date of Patent: Sep. 29, 2020

(54) HIGH ENTROPY ALLOY ARTICLE, METHOD FOR MANUFACTURING SAME, AND PRODUCT USING SAME

(71) Applicant: HITACHI METALS, LTD., Tokyo (JP)

(72) Inventors: Tadashi Fujieda, Tokyo (JP); Kousuke Kuwabara, Tokyo (JP); Mamoru Hirota, Tokyo (JP); Kinya Aota, Tokyo (JP); Takahiko Kato, Tokyo (JP); Akihiko Chiba, Sendai (JP); Yuichiro Koizumi, Sendai (JP); Kenta Yamanaka, Sendai (JP)

(73) Assignee: Hitachi Metals, Ltd., Tokyo (JP)

( * ) Notice: Subject to any disclaimer, the term of this patent is extended or adjusted under 35 U.S.C. 154(b) by 220 days.

(21) Appl. No.: 15/781,963

(22) PCT Filed: Nov. 8, 2016

(86) PCT No.: PCT/JP2016/083011
§ 371 (c)(1),
(2) Date: Jun. 6, 2018

(87) PCT Pub. No.: WO2017/098848
PCT Pub. Date: Jun. 15, 2017

(65) Prior Publication Data
US 2018/0363104 A1 Dec. 20, 2018

(30) Foreign Application Priority Data
Dec. 10, 2015 (JP) .................... 2015-241248

(51) Int. Cl.
*C22C 30/00* (2006.01)
*B33Y 80/00* (2015.01)
(Continued)

(52) U.S. Cl.
CPC ............... *C22C 30/00* (2013.01); *B22F 1/00* (2013.01); *B22F 1/0011* (2013.01); *B22F 3/105* (2013.01);
(Continued)

(58) Field of Classification Search
CPC ....... C22C 30/00; C22C 19/00; C22C 1/0433; B22F 3/105; B22F 9/08; B22F 1/00;
(Continued)

(56) References Cited

U.S. PATENT DOCUMENTS

2002/0159914 A1  10/2002  Yeh
2008/0031769 A1   2/2008  Yeh
2017/0209922 A1   7/2017  Kato et al.

FOREIGN PATENT DOCUMENTS

CN      103252496 A    8/2013
CN      104308153 A    1/2015
(Continued)

OTHER PUBLICATIONS

Y. L. Chou et al., Effect of Inhibitors on the Critical Pitting Temperature of the High Entropy Alloy Co1.5CrFeNi1.5Ti0.5Mo0.1, 2011 J. Electrochem. Soc. 158 C246 (Year: 2011).*
(Continued)

*Primary Examiner* — Jessee R Roe
*Assistant Examiner* — Rebecca Janssen
(74) *Attorney, Agent, or Firm* — Volpe and Koenig, P.C.

(57) ABSTRACT

An object of the invention is to provide: an HEA article that has excellent homogeneity in the alloy composition and microstructure as well as significant shape controllability, using an HEA with significant mechanical strength and high corrosion resistance; a method for manufacturing the HEA article; and a product using the HEA article. There is provided an HEA article comprising: Co, Cr, Fe, Ni, and Ti elements, each element in content of 5 to 35 atomic %; more than 0 atomic % to 8 atomic % of Mo %; and remainder substances of unavoidable impurities.

18 Claims, 5 Drawing Sheets

(51) Int. Cl.
- *B22F 3/105* (2006.01)
- *B22F 9/08* (2006.01)
- *B33Y 70/00* (2020.01)
- *F04D 17/10* (2006.01)
- *B33Y 10/00* (2015.01)
- *F04D 29/02* (2006.01)
- *F04D 29/28* (2006.01)
- *B22F 1/00* (2006.01)
- *B22F 3/16* (2006.01)
- *C22C 19/00* (2006.01)

(52) U.S. Cl.
CPC .................. *B22F 3/16* (2013.01); *B22F 9/08* (2013.01); *B22F 9/082* (2013.01); *B33Y 70/00* (2014.12); *B33Y 80/00* (2014.12); *C22C 19/00* (2013.01); *F04D 17/10* (2013.01); *F04D 29/02* (2013.01); *F04D 29/023* (2013.01); *F04D 29/28* (2013.01); *F04D 29/284* (2013.01); *B22F 2301/15* (2013.01); *B22F 2301/205* (2013.01); *B22F 2301/35* (2013.01); *B22F 2304/10* (2013.01); *B33Y 10/00* (2014.12)

(58) Field of Classification Search
CPC .......... B22F 3/16; B22F 1/0011; B22F 9/082; B22F 2301/15; B22F 2301/205; B22F 2301/35; B22F 2304/10; F04D 29/02; F04D 29/28; F04D 17/10; F04D 29/023; F04D 29/284; B33Y 70/00; B33Y 80/00; B33Y 10/00

See application file for complete search history.

(56) References Cited

FOREIGN PATENT DOCUMENTS

| | | |
|---|---|---|
| JP | 2002-173732 A | 6/2002 |
| WO | 2016/013498 A1 | 1/2016 |

OTHER PUBLICATIONS

Weight percent to atomic percent calculations (Year: 2020).*
Chou, Y.L., et al, "Effect of Inhibitors on the Critical Pitting Temperature of the High-Entropy Alloy Co1.5CrFeNi1.5Ti0.5Mo0.1," Journal of the Electrochemical Society, Jun. 22, 2011, vol. 158, No. 8, C246-C251.
International Search Report, PCT/JP2016/083011, dated Feb. 14, 2017, 1 pg.
Chinese Office Action dated Sep. 24, 2019 for the Chinese Patent Application No. 201680071488.4.
Extended European Search Report dated Jun. 17, 2019 for the European Patent Application No. 16872748.5.

* cited by examiner

INTERMETALLIC COMPOUND PHASE

LAMINATION DIRECTION
CROSS-SECTION

INTERMETALLIC COMPOUND PHASE

LAMINATION DIRECTION
LONGITUDINAL SECTION

INTERMETALLIC
COMPOUND PHASE

HIGH ENTROPY ALLOY ARTICLE, METHOD FOR MANUFACTURING SAME, AND PRODUCT USING SAME

TECHNICAL FIELD OF THE INVENTION

The present invention relates to technology of high entropy alloys and particularly to high entropy alloy articles manufactured by a powder-based additive manufacturing method, the method for manufacturing the alloy articles, and products using the alloy articles.

DESCRIPTION OF BACKGROUND ART

A high entropy alloy (HEA) has recently been developed as an alloy based on a new technological concept which is completely different from the concept of conventional alloys (e.g., an alloy in which a tiny amount of multiple kinds of subcomponent elements is added to one to three kinds of main component elements). The HEA is defined as an alloy configuring more than five kinds of main metallic elements, each having a content of 5 to 35 atomic percent, and it is known that the HEA expresses characteristics as described below.

(a) Stabilization of the mixed state resulting from the negatively-increasing mixing entropy term in the formula of Gibbs free energy; (b) diffusion delay due to complicated microstructure; (c) high degree of hardness resulting from high lattice strain due to different sizes of constituent atoms, and decrease in temperature dependency of mechanical characteristics; and (d) improved corrosion resistance as the result of combined effects of coexistence of multiple elements (also referred to as a "cocktail effect").

For example, patent literature 1 (JP 2002-173732 A) discloses a high entropy multicomponent alloy produced by casting or synthesizing multiple kinds of metallic elements, wherein the alloy contains five to eleven kinds of main metallic elements and the molar number of each kind of main metallic element is 5% to 30% of the total molar number of the alloy. Furthermore, the main metallic elements are selected from a metallic element group containing aluminum, titanium, vanadium, chromium, iron, cobalt, nickel, copper, zirconium, molybdenum, palladium, and silver.

According to the patent literature 1, it seems to be possible to provide a high entropy multicomponent alloy that is significantly harder, more heat resistant and more corrosion resistant than conventional carbon steel and alloy carbon steel, in the casting state.

CITATION LIST

Patent Literature

Patent literature 1: JP 2002-173732 A.

SUMMARY OF THE INVENTION

Problems to be Solved by the Invention

However, the inventors of the present invention studied the high entropy alloys (HEAs) in various ways and found out that the segregation of elements and unevenness of the microstructure were prone to occur during the casting process because of the complicated alloy composition, and that it was difficult to obtain a uniform HEA ingot. The segregation of elements and unevenness of the microstructure of the alloy article would result in inconsistent characteristics depending on the regions and are therefore regarded as problems to be solved.

Furthermore, the HEAs are difficult to process because of its significant hardness and resistance to become soft by tempering. Accordingly, it is difficult to form an article into a desired shape by means of mechanical processing and/or plastic deformation processing. This is a major problem to be solved before putting the HEA articles into practical and commercial use.

On the other hand, as stated above, the HEAs have attractive characteristics that cannot be obtained from conventional alloys. Therefore, development of HEA articles that have excellent homogeneity in the alloy composition and microstructure as well as significant shape controllability and a method for manufacturing the HEA articles has been strongly required.

Thus, to satisfy the above requirements, it is an objective of the present invention to provide an HEA article that has excellent homogeneity in the alloy composition and microstructure as well as significant shape controllability, using an HEA with significant mechanical strength and high corrosion resistance, and a method for manufacturing the HEA article. Also, another objective of the invention is to provide a product using the HEA article.

Solution to Problems (I) According to one aspect of the present invention, there is provided a high entropy alloy article comprising: Co (cobalt), Cr (chromium), Fe (iron), Ni (nickel), and Ti (titanium) elements, each element in content of 5 atomic percent to 35 atomic percent; more than 0 atomic percent to 8 atomic percent of Mo (molybdenum); and remainder substances of unavoidable impurities. And, acicular crystals of an intermetallic compound phase are dispersedly precipitated in the matrix phase crystals of the high entropy alloy article.

In the above high entropy alloy article (I) of the invention, the following modifications and changes can be made.

(i) The acicular crystals may be dispersedly precipitated in a three-dimensional grid-like pattern.

(ii) Chemical composition of the high entropy alloy may include 20 atomic percent to 35 atomic percent of Co, 10 atomic percent to 25 atomic percent of Cr, 10 atomic percent to 25 atomic percent of Fe, 15 atomic percent to 30 atomic percent of Ni, and 5 atomic percent to 15 atomic percent of Ti.

(iii) Chemical composition of the high entropy alloy may include 25 atomic percent to 33 atomic percent of Co, 15 atomic percent to 23 atomic percent of Cr, 15 atomic percent to 23 atomic percent of Fe, 17 atomic percent to 28 atomic percent of Ni, 5 atomic percent to 10 atomic percent of Ti, and 1 atomic percent to 7 atomic percent of Mo.

(iv) Chemical composition of said high entropy alloy may include 27 atomic percent to 33 atomic percent of Co, 18 atomic percent to 23 atomic percent of Cr, 18 atomic percent to 23 atomic percent of Fe, 17 atomic percent to 24 atomic percent of Ni, 5 atomic percent to 8 atomic percent of Ti, and 1 atomic percent to 3 atomic percent of Mo.

(v) The intermetallic compound phase may contain an $Ni_3Ti$ phase.

(vi) Tensile strength thereof may be 1000 MPa or more and breaking elongation thereof may be 3% or more.

(vii) The matrix phase crystal may be a columnar crystal and its crystal structure may contain a simple cubic crystal.

Herein, "Its crystal structure contains a simple cubic crystal" means "the main crystal structure is the simple cubic crystal."

(II) According to another aspect of the invention, there is provided a method for manufacturing the above high entropy alloy article, comprising the steps of:

mixing and melting raw materials for the high entropy alloy to form molten metal;

atomizing to form a high entropy alloy powder from the molten metal; and additive manufacturing to form an additive manufactured article with a desired shape by means of a metal powder-based additive manufacturing method using the high entropy alloy powder.

In the above method for manufacturing the above high entropy alloy article (II) of the invention, the following modifications and changes can be made.

(viii) The additive manufacturing step may comprise: a powder bed forming substep to form a powder bed of the high entropy alloy powder; a powder bed calcination substep to form a calcined object of the powder bed by heating the entire powder bed; and a local melting and solidified layer forming substep. In the local melting and solidified layer forming substep, the calcined object is locally heated to form a minute molten pool of the high entropy alloy, and the minute alloy molten pools are moved and sequentially solidified by means of scanning of the local heating on the plane of the calcined object, thereby forming a solidified layer of the high entropy alloy.

(III) According to still another aspect of the invention, there is provided a product using the above high entropy alloy article. The product is an impeller of a fluid machine.

In the above product using the high entropy alloy article (III) of the invention, the following modifications and changes can be made.

(ix) The product using the high entropy alloy article may be a centrifugal compressor incorporating the impeller.

Advantages of the Invention

According to the present invention, it is possible to provide a high entropy alloy (HEA) article that has excellent homogeneity in the alloy composition and microstructure as well as significant shape controllability, using an HEA with significant mechanical strength and high corrosion resistance, and a method for manufacturing the HEA article. Furthermore, it is possible to provide a product using the HEA article.

DETAILED DESCRIPTION OF THE PREFERRED EMBODIMENTS (Basic Concept of the Present Invention)

As stated before, although the HEA has attractive characteristics (e.g., significant hardness and resistance to become soft by tempering) that cannot be obtained from conventional alloys, it is difficult to process the HEA and form an HEA article into a desired shape. As the result of various studies conducted by the inventors, it is revealed that the HEA ingot having a general cast microstructure is significantly resistant to deformation and poor in ductility.

Accordingly, the inventors intensively carried out studies of alloy composition and shape control methods to develop HEA articles excellent in shape controllability and ductility without having to sacrifice the attractive characteristics of the HEA. As a result, the inventors found it possible to obtain an HEA article that can solve the problem by forming an additive manufactured article by means of an additive manufacturing method using the Co—Cr—Fe—Ni—Ti—Mo alloy powder. The present invention is based on that concept.

Hereinafter, preferred embodiments of the invention will be described with reference to the drawings according to the HEA article production procedures. However, the invention is not limited to specific embodiments described below, and various combinations and modifications are possible without departing from a technical concept of the invention.

[Method for Manufacturing HEA Article]

Figure 1:
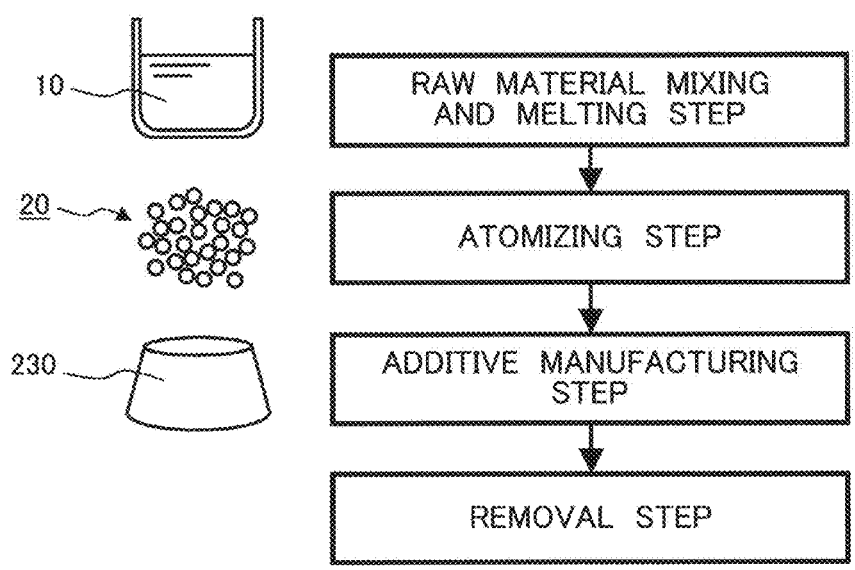
FIG. 1 is an exemplary process chart showing a method for manufacturing a high entropy alloy article according to the present invention.

FIG. 1 is an exemplary process chart showing a method for manufacturing a high entropy alloy article according to the invention. As shown in FIG. 1, the manufacturing method of the invention includes a raw material mixing and melting step, an atomizing step, an additive manufacturing step, and a removal step. Hereinafter, each step of the manufacturing method will be described more specifically.

(Raw Material Mixing and Melting Step)

As shown in FIG. 1, firstly the raw material mixing and melting step is performed in which molten metal 10 is formed by mixing and melting raw materials having desired HEA composition (Co—Cr—Fe—Ni—Ti—Mo). A raw material mixing method and a melting method are not particularly limited, and any conventional method for manufacturing high mechanical strength and high corrosion-resistant alloys can be utilized. For example, vacuum melting is preferable as a melting method. It is also preferable to refine molten metal 10 by simultaneously utilizing a vacuum carbon deoxidizing technique or the like.

As main components, the HEA composition of the invention contains five elements, Co, Cr, Fe, Ni and Ti; content of each element is between 5 atomic percent and 35 atomic percent. As a subcomponent, it contains more than 0 atomic percent to 8 atomic percent of Mo. Remainder substances are unavoidable impurities.

More specifically, content of the component Co is preferably between 20 atomic percent and 35 atomic percent;

more preferably between 25 atomic percent and 33 atomic percent; and further preferably between 27 atomic percent and 33 atomic percent.

Content of the component Cr is preferably between 10 atomic percent and 25 atomic percent; more preferably between 15 atomic percent and 23 atomic percent; and further preferably between 18 atomic percent and 23 atomic percent.

Content of the component Fe is preferably between 10 atomic percent and 25 atomic percent; more preferably between 15 atomic percent and 23 atomic percent; and further preferably between 18 atomic percent and 23 atomic percent.

Content of the component Ni is preferably between 15 atomic percent and 30 atomic percent; more preferably between 17 atomic percent and 28 atomic percent; and further preferably between 17 atomic percent and 24 atomic percent.

Content of the component Ti is preferably between 5 atomic percent and 15 atomic percent; more preferably between 5 atomic percent and 10 atomic percent; and further preferably between 5 atomic percent and 8 atomic percent.

Content of the component Mo is preferably more than 0 atomic percent to 8 atomic percent; more preferably between 1 atomic percent and 7 atomic percent; and further preferably between 1 atomic percent and 3 atomic percent.

If the content of each component is out of the preferable composition range, it is difficult to attain desired characteristics.

(Atomizing Step)

Next, the atomizing step to form a high entropy alloy powder 20 from the molten metal 10 is performed. An atomizing method is not particularly limited, and any conventional method can be utilized. For example, a gas atomizing technique or a centrifugal atomizing technique that enables high purity, uniform composition, and formation of spherical particles can be preferably used.

For handling and filling characteristics, the average particle diameter of the alloy powder 20 is preferably between 10 μm and 1 mm, and the more preferable diameter is between 20 μm and 500 μm. If the average particle diameter is less than 10 μm, the alloy powder 20 is prone to fly up easily in the subsequent additive manufacturing step, which could result in decreasing the accuracy of the shape of an additive manufactured article. On the other hand, if the average particle diameter exceeds 1 mm, surface roughness of the resultant additive manufactured article could increase in the subsequent additive manufacturing process or the alloy powder 20 could melt insufficiently.

(Additive Manufacturing Step)

Next, the additive manufacturing step is performed to shape an additive manufactured article 230 with a desired shape by a metal powder-based additive manufacturing method using the alloy powder 20 prepared as mentioned above. By applying a metal powder-based additive manufacturing method by which near-net-shape metal articles are formed by melting and solidification instead of sintering, it is possible to form a three-dimensional metal article having a complicated shape as hard as or harder than a metal cast article. An additive manufacturing method is not particularly limited, and any conventional method is usable. For example, an electron beam melting (EBM) technique and a selective laser melting (SLM) technique can be preferably utilized for the metal powder-based additive manufacturing method.

Figure 2:
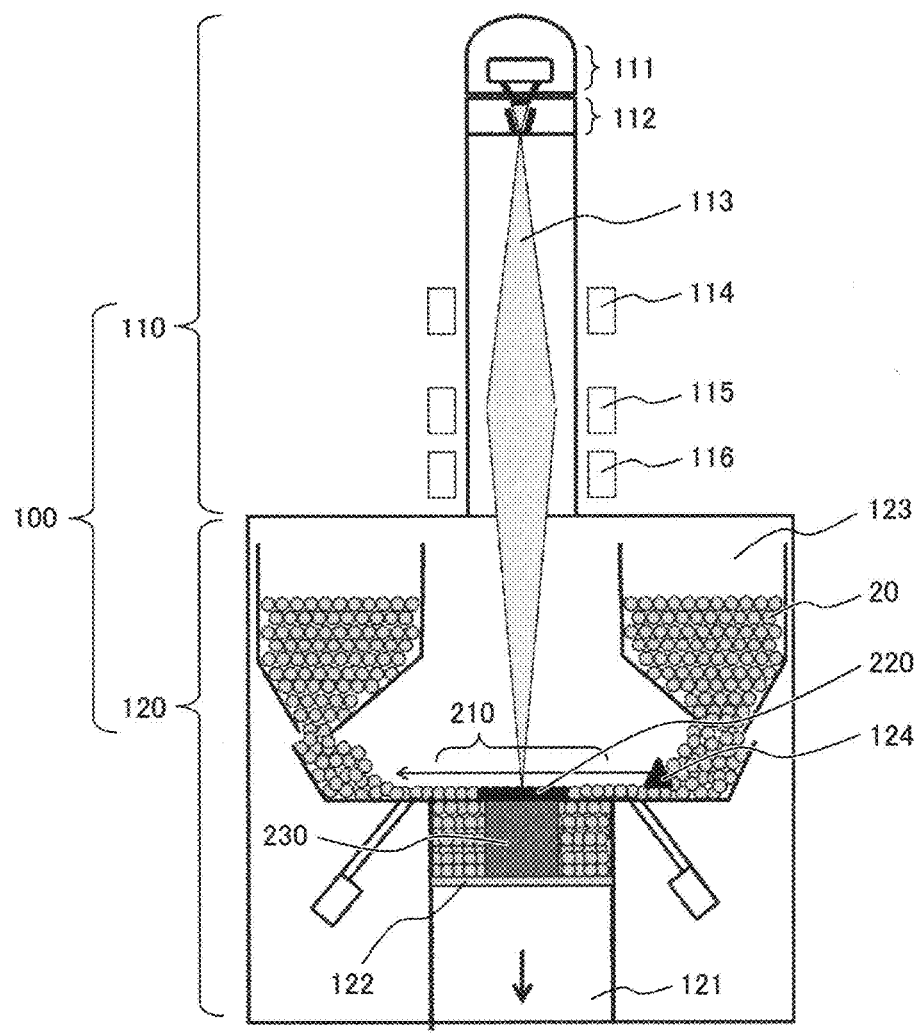
FIG. 2 is an exemplary schematic illustration showing cross-sectional view of a configuration of an EBM powder-based additive manufacturing apparatus and an additive manufacturing method.

The additive manufacturing step will be described using the EBM technique as an example. FIG. 2 is an exemplary schematic illustration showing cross-sectional view of a configuration of an EBM powder-based additive manufacturing apparatus and an additive manufacturing method. As shown in the drawing, the EBM powder-based additive manufacturing apparatus 100 configures a vacuum chamber having an electron beam control part 110 and a powder control part 120.

An exemplary procedure of the EBM powder-based additive manufacturing method is as follows. 1) A stage 121 is descended by the thickness of one layer (e.g., approximately 30 to 800 μm) of the additive manufactured article 230 to be shaped. The alloy powder 20 is supplied from a powder hopper 123 on a base plate 122 located on the upper surface of the stage 121, the alloy powder 20 is then planarized by a rake arm 124 to form a powder bed 210 (layered powder) (powder bed forming substep).

2) Thermal electrons are radiated from a tungsten filament 111 heated (e.g., to 2500° C. or higher) and accelerated by an anode 112 (e.g., to nearly half the speed of light) to form an electron beam 113. The accelerated electron beam 113 is shaped into an exact circle by an astigmatic correction apparatus 114 and converges on the powder bed 210 by a focus coil 115.

3) The powder bed 210 overall is preliminary heated by scanning relatively weak (blunt) focused beam using a deflection coil 116 to form a calcined object of the powder bed. In the EBM technique, it is preferable that the substep (powder bed calcination substep) to form a calcined object of the powder bed be performed before the powder bed is locally melted and solidified. This is conducted to prevent the powder bed from flying up due to the electrification of the alloy powder resulting from the radiation of a focused electron beam that is intended to locally melt the powder bed. Also, heating in this substep is additionally effective because subsequent deformation of the additive manufactured article 230 can be suppressed.

The calcination temperature for calcining the powder bed 210 is preferably between 900° C. and 1000° C. When the calcination temperature drops below 900° C., sintering of the alloy powder does not progress much, making it difficult to form a calcined object. On the other hand, when the calcination temperature rises above 1000° C., sintering of the alloy powder progresses too quickly, making it difficult to remove the additive manufactured article 230 (i.e. difficult separation of the additive manufactured article 230 from the calcined object).

4) Next, a local melting and solidified layer forming substep is performed. That is, a minute alloy molten pool is first formed by radiating a strong focused electron beam for the local melting onto the calcined object of the powder bed, based on 2D (two-dimensional) slice data converted from 3D CAD (three-dimensional computer-aided design) data of the additive manufactured article 230 to be shaped. The minute alloy molten pool is then moved and sequentially solidified by means of scanning of the focused electron beam. Thus, 2D slice solidified layer 220 is formed.

5) The above procedure from 1) to 4) is repeated to form an additive manufactured article 230 having a desired shape.

(Removal Step)

The additive manufactured article 230 formed through the above steps is buried in the calcined object. Therefore, a step to get out the additive manufactured article 230 from the calcined object is then performed. A method to get out the additive manufactured article 230 (i.e., a method of separating the additive manufactured article 230 from the calcined object, and a method of separating the additive manufactured article 230 from the base plate 122) is not particularly limited, and any conventional method can be utilized. For example, a sandblasting technique using the alloy powder 20 is preferable. The sandblasting technique using the alloy powder 20 enables the removed calcined object to be ground together with the blasted alloy powder 20, and the obtained alloy powder can be reused as an alloy powder 20.

[Hea Article]

After the removal step, a specimen was sampled from the additive manufactured article 230 and a microstructure of the specimen was observed by means of an optical microscope and an electron microscope. As a result, it is revealed that a matrix phase of the additive manufactured article 230 has a structure (so-called, quench-solidified structure) in that minute columnar crystals (average particle diameter of 100 µm or less) stand together in large numbers along the lamination direction of the additive manufactured article 230. In addition, further observation has revealed that acicular crystals of an intermetallic compound phase are dispersedly precipitated in a grid-like pattern in the matrix phase crystals of the additive manufactured article 230.

Figure 3A:
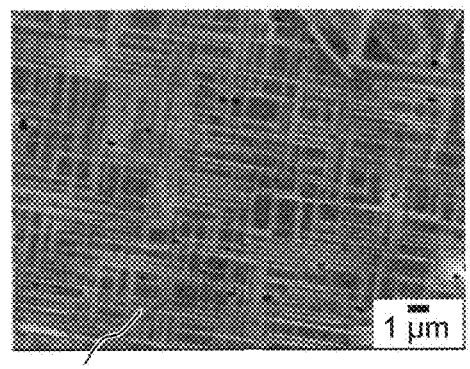
FIG. 3A is an exemplary electron microscopy image showing a microstructure of a cross sectional view of the additive manufactured article made of the HEA according to the invention.
Figure 3A:
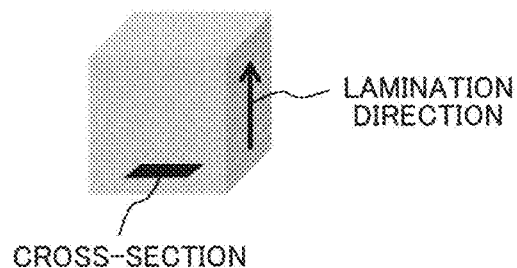
Figure 3B:
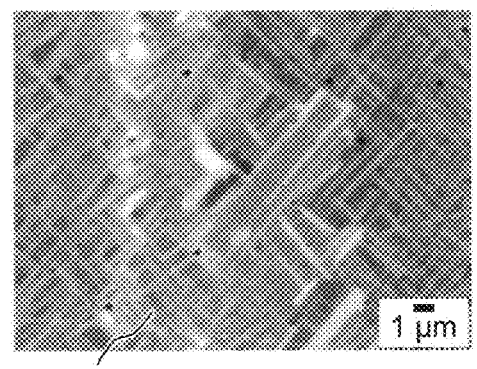
FIG. 3B is an exemplary electron microscopy image showing a microstructure of a longitudinal sectional view of the additive manufactured article made of the HEA according to the invention.
Figure 3B:
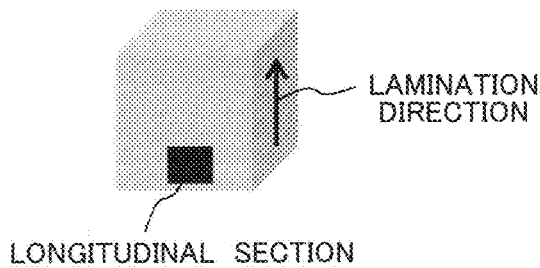

FIG. 3A is an exemplary electron microscopy image showing a microstructure of a cross sectional view (i.e., a plane perpendicular to the lamination direction, a plane whose normal line is along the lamination direction) of the additive manufactured article made of the HEA according to the invention. FIG. 3B is an exemplary electron microscopy image showing a microstructure of a longitudinal sectional view (i.e., a plane along the lamination direction, a plane whose normal line is perpendicular to the lamination direction) of the additive manufactured article made of the HEA according to the invention.

As shown in FIGS. 3A and 3B, the acicular crystals are dispersedly precipitated in a grid-like pattern in both the cross sectional view and the longitudinal sectional view of the additive manufactured article 230. It is therefore deemed that the acicular crystals are dispersedly precipitated in a three-dimensional grid-like pattern.

[Products Using HEA Article]

Figure 4:
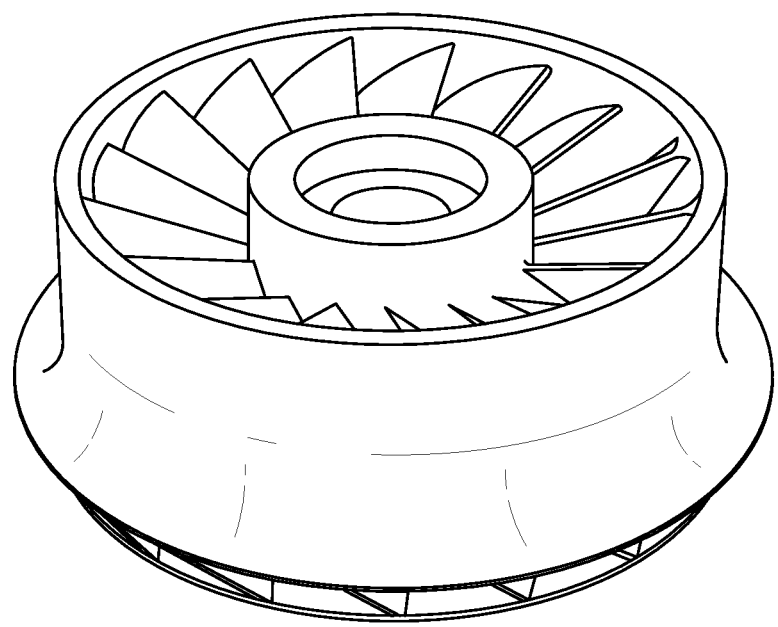
FIG. 4 is a photograph of an impeller of a fluid machine showing an example of a product using the HEA article according to the invention.

FIG. 4 is a photograph of an impeller of a fluid machine showing an example of a product using the HEA article according to the invention. Since an HEA product according to the invention is manufactured by a metal powder-based additive manufacturing method, it is possible to easily form an object that has a complicated shape as shown in FIG. 4. Furthermore, the impeller using the HEA article according to the invention has both excellent mechanical characteristics and high corrosion resistance; therefore, it is significantly durable even in environments exposed to severe stress and corrosion.

Figure 5:
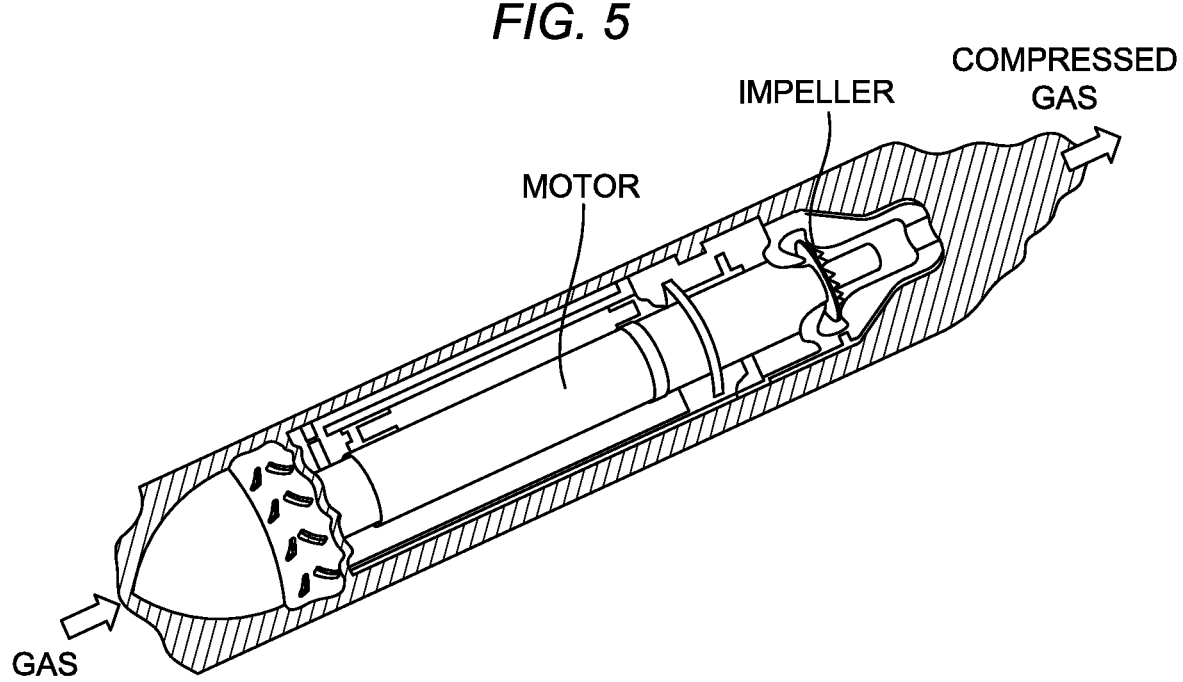
FIG. 5 is a schematic illustration showing a cross-sectional view of a centrifugal compressor into which the impeller according to the invention is incorporated.

FIG. 5 is a schematic illustration showing a cross-sectional view of a centrifugal compressor into which the impeller according to the invention is incorporated. This is another example of a product made of an HEA article according to the invention. The use of the impeller, which is significantly durable even in environments exposed to severe stress and corrosion, will contribute to the improved long-term reliability of the centrifugal compressor.

EXAMPLES

Hereinafter, the present invention will be described more specifically by showing examples and comparative examples. However, the invention is not limited to those examples.

Experimental 1

(Preparation of HEA Powders 1 to 6)

First, the raw material mixing and melting step was conducted, in which raw materials were mixed so as to have nominal composition shown in Table 1 and melted by the vacuum melting technique to form a molten metal. Then, the atomizing step was conducted using the gas atomizing technique to form an alloy powder from the molten metal. Subsequently, the obtained alloy powder was sieved into a particle diameter range from 45 µm to 105 µm. Thus, HEA powders 1 to 6 were prepared. Then, the particle size distributions of the HEA powders 1 to 6 were measured by means of a laser diffraction particle size distribution measuring apparatus. The result indicates that the average particle diameter of each powder was approximately 70 µm.

TABLE 1

Nominal composition of HEA powders 1 to 6 (unit: atomic %).

|  | Co | Cr | Fe | Ni | Ti | Mo |
| --- | --- | --- | --- | --- | --- | --- |
| HEA powder 1 | 26.8 | 17.9 | 17.9 | 26.8 | 8.9 | 1.8 |
| HEA powder 2 | 26.3 | 17.5 | 17.5 | 26.3 | 8.8 | 3.5 |
| HEA powder 3 | 25.4 | 17.0 | 17.0 | 25.4 | 8.5 | 6.8 |
| HEA powder 4 | 25.0 | 16.7 | 16.7 | 25.0 | 8.3 | 8.3 |
| HEA powder 5 | 28.9 | 19.2 | 19.2 | 23.1 | 7.7 | 1.9 |
| HEA powder 6 | 31.3 | 20.8 | 20.8 | 18.8 | 6.3 | 2.1 |

Experimental 2

(Production of HEA Articles 1e to 6e of Additive Manufactured Article)

Using the HEA powder 1 prepared in experimental 1, an additive manufactured article was formed by the EBM technique according to the additive manufacturing processes with the powder-based additive manufacturing apparatus (made by Arcam AB, model: A2X) as shown in FIG. 2. The additive manufactured article is a columnar object with a diameter of 14 mm and a height of 85 mm, and the height direction is the lamination direction. The calcination temperature for the powder bed was set to 950° C.

After the additive manufacturing step, the removal step was conducted in which the calcined object around the additive manufactured article was removed by the sandblasting technique using the HEA powder 1. Thus, the HEA article 1e of the additive manufactured article was obtained.

In the same manner as the above, the additive manufacturing step and the removal step were performed for the HEA powders 2 to 6. Thus, HEA articles 2e to 6e of the additive manufactured article were fabricated.

Experimental 3

(Production of HEA Articles 1c to 4c of General Cast Article)

By means of an arc melting technique using a water-cooling copper mold, the HEA powder 1 prepared in experimental 1 was cast into a general cast article which is a prismatic object with a width of 14 mm, a length of 80 mm and a height of 15 mm. Thus, an HEA article 1c of general cast article was formed. Herein, in order to suppress the segregation of constituent elements and unevenness of the microstructure as much as possible during the casting process, melting was repeatedly conducted more than five times.

The same procedures to form the HEA article 1c were performed for the HEA powders 2 to 4. Thus, HEA articles 2c to 4c of general cast article were fabricated.

Experimental 4

(Observation of Microstructure of HEA Articles)

A test specimen for the observation of microstructure was sampled from each HEA article and the microstructure of the specimen was observed using an optical microscope, a scanning electron microscope (SEM) and an X-ray diffraction (XRD) apparatus. Table 2 shows the production specifications of each HEA article and the microstructure observation results.

TABLE 2

Production specifications of each HEA article and microstructure observation results.

| HEA article | HEA powder | Production method | Matrix phase structure Crystal shape | Crystal structure | Intermetallic compound Main precipitation phase | Precipitation morphology |
|---|---|---|---|---|---|---|
| 1e | 1 | Additive manufacturing | Columnar crystal | SC | Ni$_3$Ti | Three-dimensional grid-like pattern |
| 1c | | General casting | Equiaxed crystal | FCC | | Random aggregation |
| 2e | 2 | Additive manufacturing | Columnar crystal | SC (FCC) | | Three-dimensional grid-like pattern |
| 2c | | General casting | Equiaxed crystal | SC + FCC | | Random aggregation |
| 3e | 3 | Additive manufacturing | Columnar crystal | SC (FCC) | | Three-dimensional grid-like pattern |
| 3c | | General casting | Equiaxed crystal | SC + FCC | | Random aggregation |
| 4e | 4 | Additive manufacturing | Columnar crystal | SC (FCC) | | Three-dimensional grid-like pattern |
| 4c | | General casting | Equiaxed crystal | SC + FCC | | Random aggregation |
| 5e | 5 | Additive manufacturing | Columnar crystal | SC | Ni$_3$Ti | Three-dimensional grid-like pattern |
| 6e | 6 | manufacturing | crystal | | | |

As shown in Table 2, the matrix phase of the HEA articles 1e to 6e produced by the additive manufacturing method has a structure (so-called, quench-solidified structure) in that minute columnar crystals (average particle diameter of 100 μm or less) stand together in large numbers along the lamination direction of the additive manufactured article. The structure of the columnar crystals has a simple cubic crystal structure (SC). However, based on the XRD measurement results, when it is difficult to identify whether the structure has a simple cubic crystal structure (SC) or a face-centered cubic crystal structure (FCC), being difficult to conclude it to be FCC, "SC (FCC)" is indicated.

In contrast, the matrix phase of the HEA articles 1c to 4c formed by the general casting technique has a structure consisting of equiaxed crystals whose average particle diameter is more than 100 μm. The structure of the equiaxed crystals apparently contained FCC.

Based on the observation results of the matrix phase structure, it is deemed that "whether the matrix phase structure configures columnar crystals or equiaxed crystals" and "whether the matrix phase crystal structure apparently contains face-centered cubic crystals or not" strongly depend on a rate of solidification of the HEA. In other words, they strongly depend on the duration of existence in the temperature range in which atoms of the HEA can be rearranged.

Furthermore, with regard to the precipitation of the intermetallic compound, the XRD measurement results verify that the main precipitation phase of all HEA articles is the Ni$_3$Ti phase. However, the XRD measurement results do not deny the precipitation of an NiTi phase or an NiTi$_2$ phase. In other words, there is a possibility that slight precipitation may be occurring as the NiTi phase and the NiTi$_2$ phase.

Figure 6:
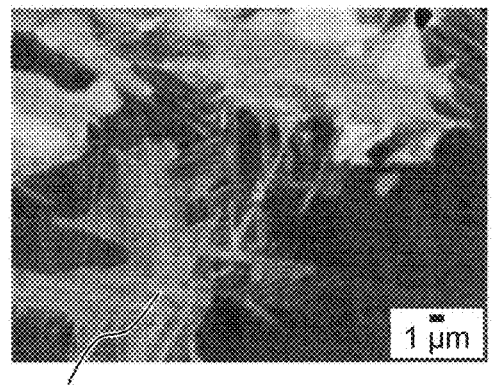
FIG. 6 is an exemplary electron microscopy image showing a microstructure of the HEA article 1c.

Concerning the precipitation morphology of the intermetallic compound, there is a large difference depending on HEA article manufacturing methods. FIGS. 3A and 3B shown before are images observed by an electron microscope showing examples of a microstructure of the HEA article 1e. FIG. 6 is an electron microscopy image showing an example of a microstructure of the HEA article 1c.

As stated above, in the HEA articles 1e to 6e produced by the additive manufacturing method, the main precipitation phase of the acicular crystal is dispersedly precipitated in a three-dimensional grid-like pattern. In comparison, as shown in FIG. 6, it is observed that acicular crystals randomly aggregate in the HEA articles 1c to 4c made by the general casting technique.

Experimental 5

(Measurement of Mechanical Properties and Corrosion Resistance of HEA Articles)

A test specimen (diameter of the parallel portion: 4 mm, length of the parallel portion: 20 mm) was sampled from each HEA article for tensile test. The test specimens of the HEA articles 1e to 6e made by the additive manufacturing method were taken so that the longitudinal direction of the test specimen matches the additive manufacturing direction (lamination direction).

Using a material universal testing machine, the room-temperature tensile test was conducted for each test specimen in accordance with JIS Z 2241 at a rate of strain of $5 \times 10^{-5}$ s$^{-1}$, and the tensile strength and the breaking elongation were measured. From 10 measurements of the tensile test, the maximum value and the minimum value were excluded, and the average value of the remaining 8 measurements was obtained. To evaluate the tensile strength, the value of 1000 MPa or more is judged to be "Passed" and the value of less than 1000 MPa is judged to be "Failed". To evaluate the breaking elongation, the value of 3% or more is judged to be "Passed" and the value of less than 3% is judged to be "Railed". The results are shown in Table 3.

Furthermore, from each HEA article made above, a polarization test specimen (length of 15 mm, width of 15 mm, and thickness of 2 mm) was sampled for the pitting corrosion test. The pitting corrosion test was conducted for each polarization test specimen in accordance with JIS G 0577. Specifically, under the conditions of "Test area: 1 cm², clearance corrosion prevention electrodes attached to the polarization test specimen, reference electrode: saturated silver/silver chloride electrode, test solution: 3.5% sodium chloride solution deaerated by argon gas, test temperature: 30° C., potential sweep rate: 20 mV/min," the anode polarization curve of the polarization test specimen was measured and the pitting potential corresponding to the current density of 100 µA/cm² was obtained. To evaluate the pitting potential, the value of 1.0 V or more is judged to be "Passed" and the value less than 1.0 V is judged to be "Failed". Results of the pitting corrosion test are also shown in Table 3.

TABLE 3

Measurement results of mechanical properties and corrosion resistance of each HEA article.

| HEA article | Mechanical properties | | Corrosion resistance |
| | Tensile strength (MPa) | Breaking elongation (%) | Pitting potential (V vs. Ag/AgCl) |
| --- | --- | --- | --- |
| 1e | 1065/Passed | 5.3/Passed | 1.066/Passed |
| 1c | 780/Failed | 3.3/Passed | 1.091/Passed |
| 2e | 1080/Passed | 4.1/Passed | 1.101/Passed |
| 2c | 813/Failed | 2.1/Failed | 1.098/Passed |
| 3e | 1052/Passed | 3.2/Passed | 1.082/Passed |
| 3c | 795/Failed | 1.7/Failed | 1.069/Passed |
| 4e | 780/Failed | 1.1/Failed | 1.065/Passed |
| 4c | 623/Failed | 0.5/Failed | 1.110/Passed |
| 5e | 1215/Passed | 30/Passed | 1.120/Passed |
| 6e | 1010/Passed | 45/Passed | 1.162/Passed |

As shown in Table 3, it is verified that the HEA articles 1e to 3e, 5e, and 6e produced by the additive manufacturing method, which are the examples of the invention, have excellent mechanical properties; tensile strength of 1000 MPa or more and breaking elongation of 3% or more. Furthermore, it is also verified that the HEA articles 5e and 6e which contain a relatively small amount of Ni component and Ti component have an excellent breaking elongation property.

On the other hand, the HEA articles 1c to 4c of general cast article and the HEA article 4e whose alloy composition is out of specifications of the invention are the comparative examples. In those comparative examples, the tensile strength is less than 1000 MPa and/or breaking elongation is less than 3%, and then the mechanical properties are failed as a whole. As to the HEA article 4e, the mechanical properties are failed although it was made by the additive manufacturing method. This verifies that addition of more than 8 atomic percent of Mo is not preferable.

Regarding the corrosion resistance, all of the HEA articles show pitting potential of 1.0 V vs. Ag/AgCl or more, which verifies that all of the HEA articles have excellent corrosion resistance independent of manufacturing methods or microstructure. In other words, the HEA articles according to the invention are deemed to have excellent corrosion resistance because of the combination of the elements (Co—Cr—Fe—Ni—Ti—Mo).

Experimental 6

(Production and Inspection of Product Using HEA Article)

By means of the manufacturing method used to produce the HEA article 1e (i.e., the additive manufacturing method using the HEA powder 1), an impeller shown in FIG. 4 was fabricated. For the obtained impeller, an internal defect inspection by X-ray CT scan was conducted and the size was measured. As a result, no particular internal defect was found and deformation out of the design dimension was not detected either. This experiment verifies the effectiveness of the invention.

The above-described embodiments and Examples have been specifically given in order to help with understanding on the present invention, but the invention is not limited to the configuration equipped with all the components described above. For example, some of the configurations of a certain embodiment may be replaced with the configurations of the other embodiments, and the configurations of the other embodiments may be added to the configurations of the subject embodiment. Furthermore, some of the configurations of each embodiment and example may be omitted, replaced with other configurations, and added to other configurations.

LEGEND

10 . . . molten metal;
20 . . . alloy powder;
100 . . . EBM powder-based additive manufacturing apparatus;
110 . . . electron beam control part;
120 . . . powder control part;
111 . . . tungsten filament;
112 . . . anode;
113 . . . electron beam;
114 . . . astigmatic correction apparatus;
115 . . . focus coil;
116 . . . deflection coil;
121 . . . stage;
122 . . . base plate;
123 . . . powder hopper;
124 . . . rake arm;
210 . . . powder bed;
220 . . . solidified layer; and
230 . . . additive manufactured article.

The invention claimed is:

1. A high entropy alloy article comprising
Co, Cr, Fe, Ni, and Ti elements, each element in content of 5 atomic percent to 35 atomic percent,
more than 0 atomic percent to 8 atomic percent of Mo, and remainder substances of unavoidable impurities, wherein an intermetallic compound phase of acicular crystals is dispersedly precipitated in the matrix phase crystals of the high entropy alloy article.

2. The high entropy alloy article according to claim 1, wherein
the acicular crystals are dispersedly precipitated in a three-dimensional grid-like pattern.

3. The high entropy alloy article according to claim 1, wherein
chemical composition of the high entropy alloy comprises
20 atomic percent to 35 atomic percent of Co,
10 atomic percent to 25 atomic percent of Cr,
10 atomic percent to 25 atomic percent of Fe,
15 atomic percent to 30 atomic percent of Ni, and
5 atomic percent to 15 atomic percent of Ti.

4. The high entropy alloy article according to claim 1, wherein
chemical composition of the high entropy alloy comprises
25 atomic percent to 33 atomic percent of Co,
15 atomic percent to 23 atomic percent of Cr,
15 atomic percent to 23 atomic percent of Fe, 17 atomic percent to 28 atomic percent of Ni,
5 atomic percent to 10 atomic percent of Ti, and
1 atomic percent to 7 atomic percent of Mo.

5. The high entropy alloy article according to claim 1, wherein
chemical composition of said high entropy alloy comprises
27 atomic percent to 33 atomic percent of Co,
18 atomic percent to 23 atomic percent of Cr,
18 atomic percent to 23 atomic percent of Fe,
17 atomic percent to 24 atomic percent of Ni,
5 atomic percent to 8 atomic percent of Ti, and
1 atomic percent to 3 atomic percent of Mo.

6. The high entropy alloy article according to claim 1, wherein
the intermetallic compound phase contains an $Ni_3Ti$ phase.

7. The high entropy alloy article according to claim 1, wherein
tensile strength thereof is 1000 MPa or more and breaking elongation thereof is 3% or more.

8. The high entropy alloy article according to claim 1, wherein
the matrix phase crystal is a columnar crystal, and the crystal structure thereof contains a simple cubic crystal.

9. A method for manufacturing the high entropy alloy article according to claim 1, comprising the steps of:
mixing and melting raw materials for the high entropy alloy to form molten metal;
atomizing to form a high entropy alloy powder from the molten metal; and
additive manufacturing to form an additive manufactured article with a desired shape by means of a metal powder-based additive manufacturing method using the high entropy alloy powder.

10. The method for manufacturing the high entropy alloy article according to claim 9, wherein
the additive manufacturing step comprises:
a powder bed forming substep to form a powder bed of the high entropy alloy powder;
a powder bed calcination substep to form a calcined object of the powder bed by heating the entire powder bed; and
a local melting and solidified layer forming substep wherein
the calcined object is locally heated to form a minute molten pool of the high entropy alloy, and the minute alloy molten pools are moved and sequentially solidified by means of scanning of the local heating on the plane of the calcined object, thereby forming a solidified layer of the high entropy alloy.

11. A product using a high entropy alloy article,
said high entropy alloy article being the high entropy alloy article according to claim 1, and the product being an impeller of a fluid machine.

12. A centrifugal compressor incorporating the impeller according to claim 11.

13. The high entropy alloy article according to claim 2, wherein
chemical composition of the high entropy alloy comprises
20 atomic percent to 35 atomic percent of Co,
10 atomic percent to 25 atomic percent of Cr,
10 atomic percent to 25 atomic percent of Fe,
15 atomic percent to 30 atomic percent of Ni, and
5 atomic percent to 15 atomic percent of Ti.

14. The high entropy alloy article according to claim 2, wherein
the intermetallic compound phase contains an $Ni_3Ti$ phase.

15. The high entropy alloy article according to claim 2, wherein
tensile strength thereof is 1000 MPa or more and breaking elongation thereof is 3% or more.

16. The high entropy alloy article according to claim 2, wherein
the matrix phase crystal is a columnar crystal, and the crystal structure thereof contains a simple cubic crystal.

17. A product using a high entropy alloy article,
said high entropy alloy article being the high entropy alloy article according to claim 2, and the product being an impeller of a fluid machine.

18. A centrifugal compressor incorporating the impeller according to claim 17.

* * * * *